United States Patent
Luo et al.

(10) Patent No.: US 10,277,912 B2
(45) Date of Patent: Apr. 30, 2019

(54) METHODS AND APPARATUS FOR STORING DATA RELATED TO VIDEO DECODING

(71) Applicants: Ning Luo, Fuzhou (CN); Huan Jian, Fuzhou (CN); Shengqin Zhang, Fuzhou (CN); Hengming Chen, Fuzhou (CN)

(72) Inventors: Ning Luo, Fuzhou (CN); Huan Jian, Fuzhou (CN); Shengqin Zhang, Fuzhou (CN); Hengming Chen, Fuzhou (CN)

(73) Assignee: Fuzhou Rockchips Electronics, Co., Ltd., Fuzhou, Fujian Province (CN)

(*) Notice: Subject to any disclaimer, the term of this patent is extended or adjusted under 35 U.S.C. 154(b) by 115 days.

(21) Appl. No.: 15/186,413

(22) Filed: Jun. 17, 2016

(65) Prior Publication Data
US 2016/0373736 A1 Dec. 22, 2016

(30) Foreign Application Priority Data
Jun. 17, 2015 (CN) .......................... 2015 1 0336502

(51) Int. Cl.
*H04N 7/12* (2006.01)
*H04N 11/02* (2006.01)
*H04N 11/04* (2006.01)
*H04N 19/423* (2014.01)
*H04N 19/50* (2014.01)

(52) U.S. Cl.
CPC .......... *H04N 19/423* (2014.11); *H04N 19/50* (2014.11)

(58) Field of Classification Search
None
See application file for complete search history.

(56) References Cited

U.S. PATENT DOCUMENTS

| | | | |
|---|---|---|---|
| 8,271,700 B1 * | 9/2012 | Annem | G06F 13/28 710/22 |
| 9,491,469 B2 * | 11/2016 | Sole Rojals | H04N 19/196 |
| 2005/0166054 A1 * | 7/2005 | Fujimoto | H04N 19/51 713/176 |
| 2009/0322772 A1 * | 12/2009 | Morimoto | G06F 12/0802 345/557 |
| 2012/0082242 A1 * | 4/2012 | Narroschke | H04N 19/423 375/240.25 |

(Continued)

*Primary Examiner* — Chikaodili E Anyikire

(57) ABSTRACT

A method for storing data related to video decoding is described. A video-decoding device may divide a video image into a plurality of coding units (CUs). Each of the plurality of CUs has a horizontal coordinate and a vertical coordinate. The video-decoding device may retrieve a first tidbit associated with a first CU from a one-dimensional storage structure. The first CU is adjacent to an un-decoded second CU. The first tidbit is generated during decoding of the first CU and stored in the one-dimensional storage structure based on a first storage index calculated using the first CU's horizontal and vertical coordinates. The video-decoding device may further decode the second CU based on the first tidbit, and store a second tidbit associated with the second CU in the one-dimensional storage structure based on a second storage index calculated using the second CU's horizontal and vertical coordinates.

18 Claims, 4 Drawing Sheets

(56) References Cited

U.S. PATENT DOCUMENTS

2013/0077884 A1\* 3/2013 Ikai .......................... G06T 9/00
  382/233
2013/0097396 A1\* 4/2013 Ordentlich ........... G11C 7/1006
  711/154

\* cited by examiner

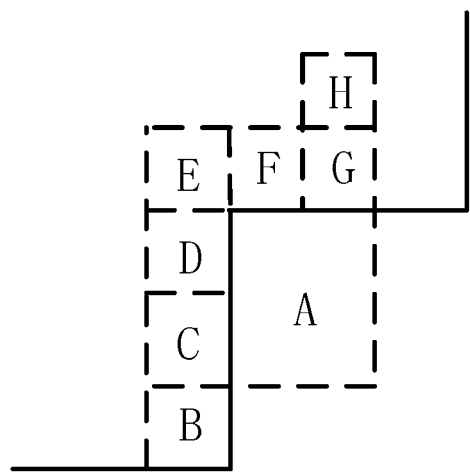
Figure 3-A
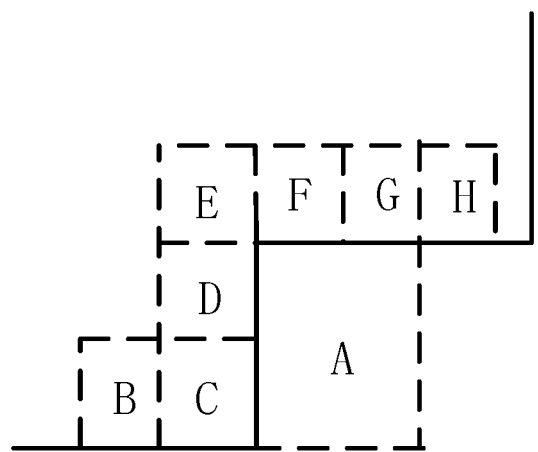
Figure 3-B

METHODS AND APPARATUS FOR STORING DATA RELATED TO VIDEO DECODING

CROSS-REFERENCE

This application is a US non-provisional application claiming priority to a Chinese Patent Application No. 201510336502.6, filed on Jun. 17, 2015, which is hereby incorporated by reference in its entirety, including any appendices or attachments thereof, for all purposes.

TECHNICAL FIELD

The present disclosure is related to image processing, and particularly to the methods and apparatus for storing data related to video decoding.

BACKGROUND

In the field of video image processing, it is often necessary to decode the video image in real-time. Conventional decoding method is to decode the video image pixel by pixel. When decoding a particular pixel in the video image, if other pixels located to the left, above-left, above, or above-right of the particular pixel are already decoded, then these pixels may be used for the prediction of the particular pixel, thereby lowering the decoding workload and increasing the decoding speed. When decoding a region of pixels, the pixels are often processed in a left-to-right order through the same line. Once one line of pixels are finished decoding, the decoding process may start from the left-most pixel in a subsequent line of pixels below the decoded line of pixels.

The conventional decoding method often has an issue related to the storing of information for the decoded pixels. If a two-dimensional storage structure is used to store all the decoded pixels, then a large cache memory may be required. If a storage structure is used to store only those pixels that are located either in a horizontal or vertical line, then there may be a problem in which some of the decoded pixels in the storage structure may be overridden and rewritten during decoding.

BRIEF DESCRIPTION OF THE DRAWINGS

FIGS. 3A and 3B illustrate multiple scenarios used to determine the location of an adjacent CU using one-dimensional storage structure.

Figure 1:
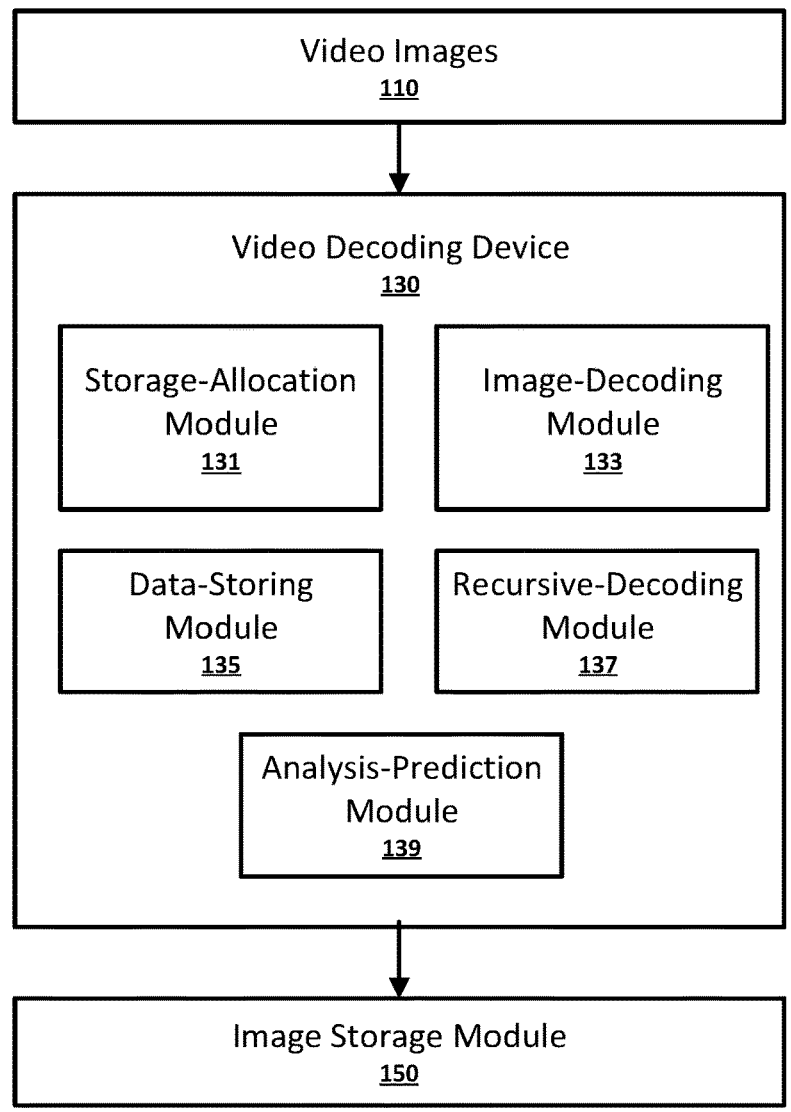
FIG. 1 shows a diagram illustrating a video-decoding device suitable for decoding video images.

all arranged in accordance to at least one or more embodiments of the present disclosure.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

FIG. 1 shows a diagram illustrating a video-decoding device suitable for decoding video images, in accordance with certain embodiments of the present disclosure. In FIG. 1, a video-decoding device 130 may be configured with, among other hardware components, a storage-allocation module 131, an image-decoding module 133, a data-storing module 135, a recursive-decoding module 137, and an analysis-prediction module 139. The video-decoding device 130 may be configured to decode one or more video images 110, which may be extracted from a video and encoded based on H.265 or other video encoding standards. The video-decoding device 130 may then store the decoded video images 110 in an image storage module 150. Thus, the video-decoding device 130 may be suitable to decode video images encoded using H.265 or any video encoding/decoding standards.

In some embodiments, the video decoding device 130 may be a hardware device containing, without limitation, a processor and memory, as well as additional electronic circuit components not shown in FIG. 1. The processor may be a general-purpose or specialized computing processor having electronic circuitry to perform arithmetical, logical, and input/output operations for the video decoding device 130. The processor may be configured to accelerate the processing of the storage-allocation module 131 and the image-decoding module 133. The processor may be configured to support functions of the data-storing module 135, recursive-decoding module 137, and/or the analysis-prediction module 139. The processor may also be configured to utilize the memory to store or retrieve un-decoded or decoded images. The memory may be volatile memory (e.g., dynamic random-access memory (DRAM) or CPU cache memory) and non-volatile memory (e.g., hard drive or flash memory). In some embodiments, the memory may be non-transitory computer-readable storage medium, containing a set of instructions which, when executed by the processor, cause the processor to perform a method for storing data related to video decoding.

In some embodiments, the storage-allocation module 131 may be configured to allocate a one-dimensional storage structure for storing data related to the video images 110, and divide the video images into coding units (CUs). Each of the CUs may have a horizontal coordinate and a vertical coordinate with respect to the video image 110. The image-decoding module 133 may be configured to decode the CUs in an orderly fashion by utilizing the one-dimensional storage structure to retrieve information generated during the decoding of some of the CUs. The data-storing module 135 may be configured to store the information generated during decoding of some CUs in the one-dimensional storage structure based on storage indexes calculated using the CU's horizontal and vertical coordinates. The image-decoding module 133 may further be configured to identify the CUs located at a boundary formed by the decoded CUs and the un-decoded CUs in the video image 110. The image-decoding module 133 may then calculate one-dimensional storage indexes based on the coordinates of the CUs located at the boundary, extract information from the one-dimensional storage structure using the storage indexes, and decode the un-decodes CUs using the extracted information.

In some embodiments, the recursive-decoding module 137 may be configured to control the image-decoding module 133 and data-storing module 135 to repeat the above decoding and data storing operations in a recursive fashion, until all the CUs in the video image 110 are decoded. The analysis-prediction module 139 may be configured to determine whether some of the CUs are decoded, based on information stored in the one-dimensional storage structure and associated with these CUs. Specifically, the analysis-prediction module 139 may predict/detect whether the CUs adjacent below-left or above-right to the CU currently being decoded ("current CU") may be decoded or not. Thus, the analysis-prediction module 139 may significantly improve the accuracy and efficiency of the decoding process.

As the length of the one-dimensional storage structure equals a limited amount of CUs, the present disclosure solves the issue of requiring a large amount of data when two-dimensional storage structure is used. Further, the one-dimensional storage structure stores all information that are required for subsequent decoding, thereby preventing data loss that may occur if storing required information in a horizontal or vertical fashion.

Figure 2:
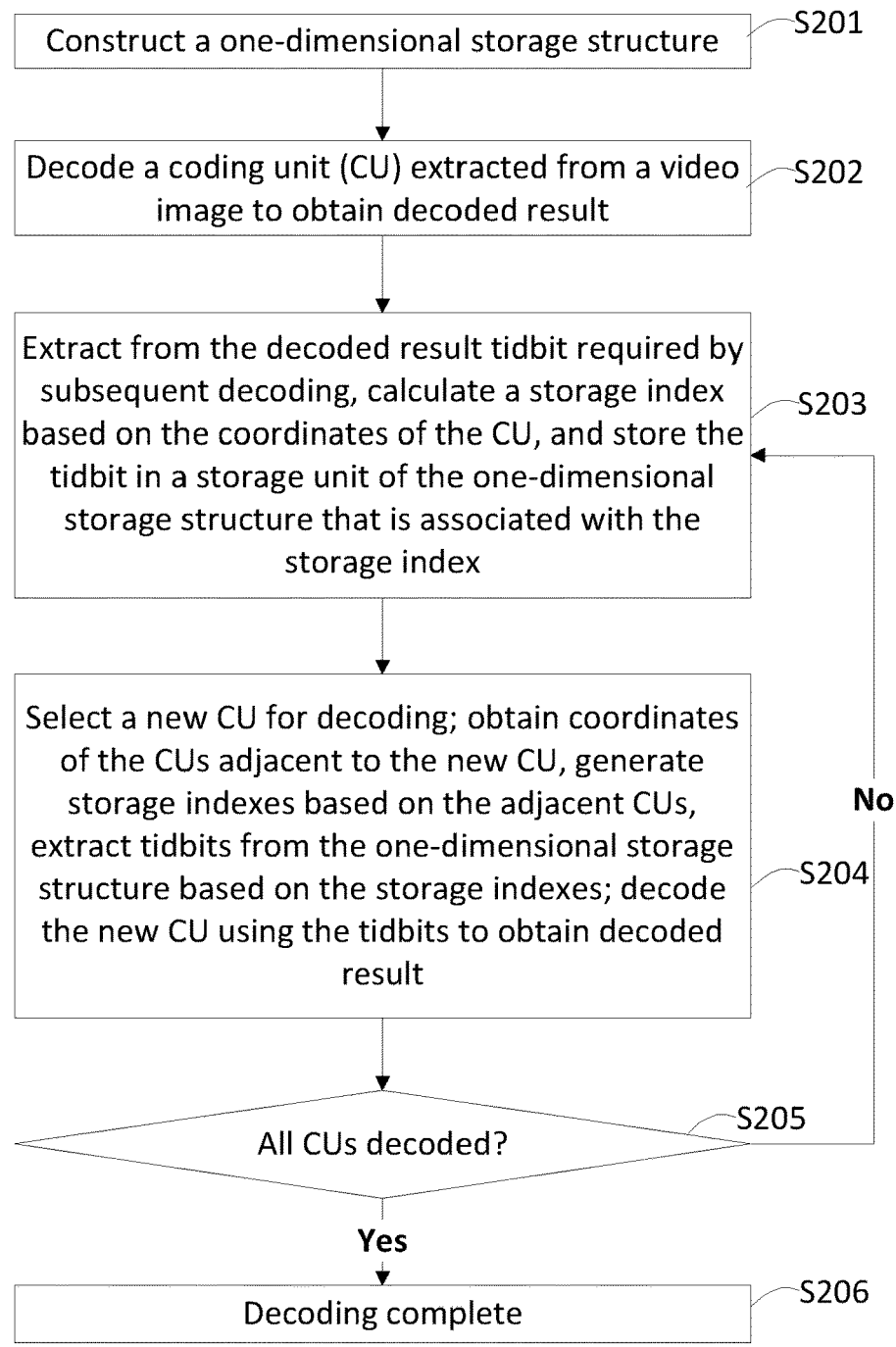
FIG. 2 shows a flow diagram illustrating one example process for decoding video images utilizing a one-dimensional storage structure.

FIG. 2 shows a flow diagram illustrating one example process for decoding video images utilizing a one-dimensional storage structure, in accordance to certain embodiments of the present disclosure. The process sets forth various functional blocks or actions (as shown in e.g., S201, S202, S203, S204, S205, and S206) that may be described as processing steps, functional operations, events, and/or acts, which may be performed by hardware, software, and/or firmware. Those skilled in the art in light of the present disclosure will recognize that numerous alternatives to the functional blocks shown in FIG. 2 may be practiced in various implementations. In some embodiments, the video-decoding device 130 of FIG. 1 may be used to implement the video-decoding process as illustrated by FIG. 2.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block S201, a video-decoding device (similar to the video-decoding device 130 of FIG. 1) may construct a one-dimensional storage structure for decoding video images. The term "one-dimensional storage structure" may refer to an area of storage space in computer cache, memory, or hard drive that can be addressed and accessed using a single variable. The one-dimensional storage structure may be implemented using multiple storage units. Each "storage unit" in the one-dimensional storage structure may have a fixed or adjustable storage volume (e.g., 1K bytes), from which data may be stored into or retrieved from using a storage index. The "storage index" may be a one-dimensional variable, with each distinctive/unique value being associated with a corresponding one of the storage units. Thus, by using the storage index as a pointer, the video-decoding device may quickly access any one of the storage units in the one-dimensional storage structure. Any linear data structure (e.g., link, queue, stack, array, etc) which can be accessed using a single storage index may also be deemed a one-dimensional storage structure.

In some embodiments, the video image to be inputted into the video-decoding device may be a single graphic image or a single image frame extracted from a video stream. The information decoded from the video image may include, without limitation, the RGB values of the pixels in the video image, the encoding methods for certain regions of the video image, the prediction directions, the movement vectors, other additional pixel values, etc. The video-decoding device may be able to calculate the number of storage units needed in the one-dimensional storage structure (also referred to as the "length" of the one-dimensional storage unit) based on the size of the video image to be decoded. The video-decoding device may then allocate the necessary storage space for the one-dimensional storage structure based on the calculated length of the one-dimensional storage structure. Such calculation of the length of the one-dimensional storage structure may be further described below.

At block S202, the video-decoding device may be configured to perform decoding on a "coding unit" ("CU") extracted from the video image to obtain decoded result for this CU. The size of the CU may be adjustable based on encoding and decoding standards and configurations. Each CU may contain one or multiple pixels extracted from the video image. When a certain CU is larger than a "basic coding unit" (defined by a certain video encoding/decoding standard), this CU may be divided into one or more smaller sub-coding units (that have the same size as, or smaller size than, a basic coding unit), which may be further divided in a recursive fashion. Thus, all the CUs extracted from the video image may or may not have the same size.

In some embodiments, the video-decoding device may divide the video image into multiple CUs, and decode these multiple CUs in a top-to-bottom, left-to-right order, based on the locations of these CUs in the video image. Thus, the video-decoding device may always decode first the top-most and/or the left-most CU that has not been decoded. In other words, from all the CUs yet to be decoded, the video-decoding device may choose the next CU for processing based on a "top-first then left-first" priority or a "left-first then top-first" priority. After finished decoding one CU, the video-decoding device may proceed to decode the next yet-to-be-decoded CU that is either below or on the right of the decoded CU, until all the CUs extracted from the video image are decoded.

At block S203, the video-decoding device may extract from the decoded result tidbit required by subsequent decoding. Based on the coordinates of the CU located in the video image, the video-decoding device may calculate a one-dimension storage index, and store such tidbit in a storage unit of the one-dimensional storage structure that is associated with the one-dimension storage index. In some embodiments, to decode the pixels within a single CU, the video-decoding device may perform similar operations by constructing a one-dimensional storage structure, calculating one-dimensional storage indexes for the pixels, and store tidbits associated with the pixels in the storage units of the one-dimensional storage structure that are associated with the one-dimensional storage indexes.

In some embodiments, the video-decoding device may extract certain "tidbit" from the decoded result generated during the decoding of one particular CU. The "tidbit" may include all relevant information (e.g., RGB values of the pixels, prediction directions, movement vectors) that is required for the decoding of an un-decoded CU adjacent to this particular CU. The tidbit may be stored in a storage unit of a one-dimensional storage structure. Which storage unit in the one-dimensional storage structure the tidbit is stored into may be determined based on the specific coordinates the particular CU is located in the video image. "Coordinates" may refer to the horizontal and vertical coordinates of the CU in relation to all the CUs in the video image, rather than the coordinates of the pixels of the CU in relation to all the pixels in the video image. The relationship between the one-dimensional storage index and the coordinate of a CU may be shown below.

In some embodiments, the storage index associated with a storage unit used to store a certain tidbit for the specific CU, may change (increase or decrease) proportionally to a "coordinate difference" value calculated by subtracting the horizontal coordinate with the vertical coordinate of the specific CU. Assuming each CU contains n*n number of pixels, to coordinate a video image for decoding, such video image may be divided into H number of CUs vertically, and W number of CUs horizontally. Thus, H stands for the height of the video image in term of number of CUs vertically, and W stands for the width of the video image in terms of the number CUs horizontally. As illustrated by a section of video image in FIG. 4, after dividing a video image into H*W number of CUs, any CU may have a coordinate of (x, y), with x being the horizontal coordinate and y being the vertical coordinate of the CU. Thus, the coordinate difference value may be referred to as a "c value", with c=x−y; c∈[−(h−1), w−1]. In other words, a CU's c value may equal to a difference between the horizontal coordinate and the vertical coordinate of the CU. If the c value of the CU is used as the storage index of the storage unit in the one-dimensional storage structure for storing tidbit of the CU, then all the tidbits associated with the CUs, which are two-dimension in nature, may be allocated and distributed into a one-dimensional storage structure. In other words, by subtracting the horizontal coordinate with the vertical coordinate, the video-decoding device transform two-dimensional information into one-dimensional information.

In some embodiments, the order of the CUs stored in the one-dimensional storage structure may be based on the ascending order or the descending order of the c values for these CUs. In other words, the storage indexes associated with the CUs may correlate proportionally to the increasing or decreasing of the c values of these CUs. Therefore, for all the CUs that have the same c value, the tidbits of these CUs may be stored to the same storage unit in the one-dimensional storage structure. Such an approach may provide convenience for sorting and managing of the tidbit data, while significantly reducing the storage space needed for data storing. In addition, the CUs that are located on the boundary separating the decoded CUs and the un-decoded CUs may be stored in a continuous storage space, which eases data accessing and data caching.

In some embodiments, the length of the one-dimensional storage structure may be determined based on the sum of the number of CUs horizontally and the number of CUs vertically minus one. For example, when decoding a video image having H*W number of CUs, with H being the height (number of CUs vertically) and W (number of CUs horizontally) being the width of the CUs, then there may be "H+W−1" possible variations of c values for all of these CUs in the video image. Thus, at block S201 above, the video-decoding device may configure the one-dimensional storage structure having a length equaling to "H+W−1". In this case, the storage space required for such one-dimensional storage structure is much smaller than a two-dimensional storage structure used to stored tidbits for all the CUs. In the example of decoding a two-dimensional 1080P video image, the storage space needed for storing tidbits for all the CUs may be up to 2,000 Kbytes, which the storage space required by the one-dimensional storage structure may be about 3 Kbytes. Thus, the present disclosure greatly reduces the storage requirement for video image decoding. The details about the utilizing of the one-dimensional storage structure to provide decoding operations and reduce the storing of useless data may be further discussed below.

At block S204, when selecting a new CU ("current CU") from the remaining un-decoded CUs for processing, the video-decoding device may require previously decoded information (i.e., tidbits) obtained from decoded CUs that are adjacent to the un-decoded CU. Since these adjacent CUs correspond to their associated storage indexes in the one-dimensional storage structure, during the decoding of the current CU, the video-decoding device may simply obtain the coordinates of these adjacent CUs, and calculate the associated storage indexes based on these coordinates. Afterward, the video-decoding device may locate the storage units in the one-dimensional storage structure based on these storage indexes, and extract the tidbits previously stored in these storage units for decoding the current CU.

Figure 4:
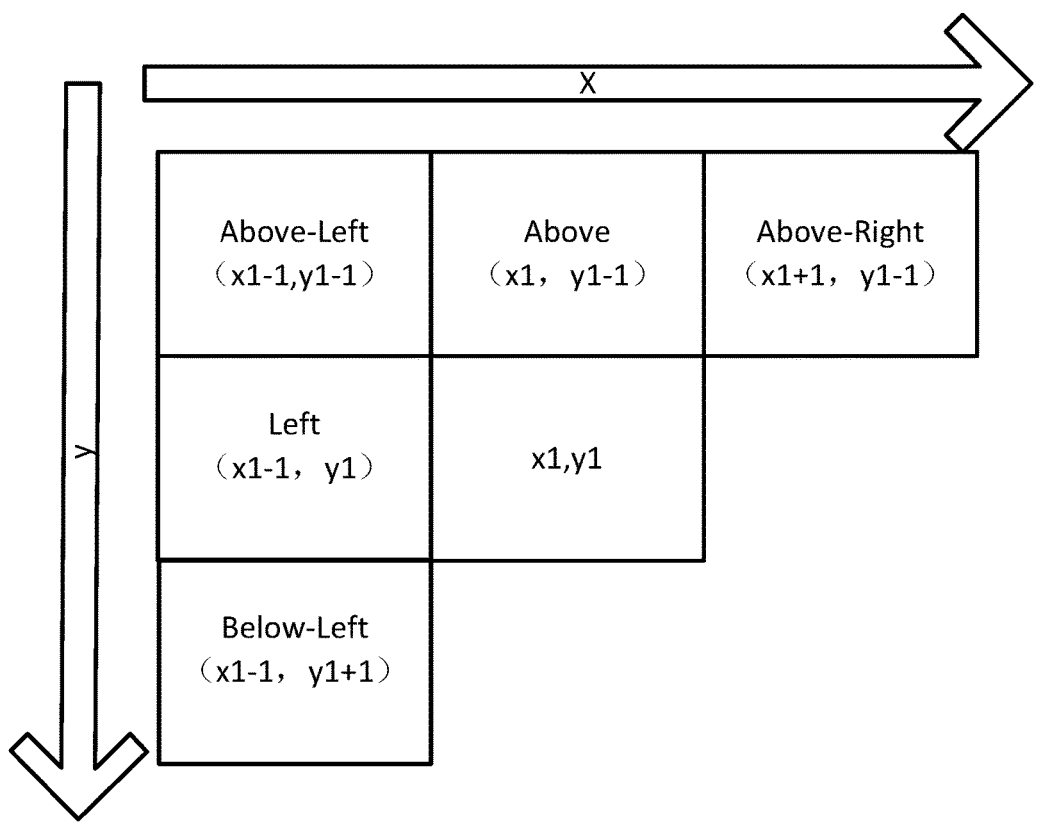
FIG. 4 illustrates decoding of a coding unit based on adjacent coding units.

FIG. 4 illustrates decoding of a CU based on adjacent CUs, in accordance with certain embodiments of the present disclosure. As described above, the video-decoding device decodes the CUs in an order starting from the top-left of the video image, gradually moving toward the right and lower side of the video image. Assuming that the current CU to be decoded is marked in the FIG. 4 with a coordinate (x1, y1). To decode this current CU, the video-decoding device may require the tidbits from the adjacent CU (x1−1, y1−1) located above-left, CU (x1, y1−1) located above, and CU (x1−1, y1) located left of the current CU. In other embodiments, the video-decoding device may further require the tidbits from the adjacent CU (x1+1, y1−1) located above-right and CU (x1−1, y1=1) located left-below, if these tidbits are available. The tidbits from the above adjacent CUs may be used to generate the decoded value for the current CU, which could greatly improve the efficiency and reduce the time for decoding the current CU.

In some approaches, the video-decoding device may only store in the storage structure the tidbits for CUs in the horizontal or vertical directions. In this case, when decoding the current CU, the tidbit for the adjacent CU above-left may either be overridden by the adjacent CU above, or by the adjacent CU left. Thus, the loss of the tidbit from the adjacent CU above-left may be unfavorable for the decoding of the current CU (x1, y1). In other approaches, the video-decoding device may utilize a two-dimensional storage structure to store tidbits for all the decoded CUs, which may lead to the consuming of a large amount of storage space.

Referring back to FIG. 4, in which the below-left CU (x1−1, y1+1), the left CU (x1−1, y1), the above-left CU (x1−1, y1−1), the above CU (x1, y1−1), and the above-right CU (x1+1, y1−1) may be adjacent decoded CUs with tidbits in the one-dimensional storage structure that can be used for the decoding of the current CU (x1, y1). Based on the characteristics in the coordinates of these CUs, their c values (i.e., c−2, c−1, c, c+1, c+2) calculated based on c=x1−y1 have no overlaps and increment gradually. Since the different c values for these adjacent decoded CUs indicate that their tidbit may be stored in different storage units of the one-dimensional storage structure, the concern that the above-left CU may be overridden by other CU is no longer present, and the video-decoding device may be able to retrieve tidbit for the above-left CU.

In other words, the required tidbits are from those CUs that are located on a boundary formed between the decoded CUs and un-decoded CUs in the video image. This boundary is one-dimensional and has a length of H+W−1. Therefore, the one-dimensional storage structure is constructed to mimic such a boundary, and have storage units associated with these CUs on the boundary. The boundary may change during the decoding process, while the length of the boundary remains the same. Still, the c value of the CUs on the boundary are always distinctive, they can be used as storage indexes for the one-dimensional storage structure.

In some embodiments, since the current CU (x1, y1) may have a respective c value ("x1−y1") equaling the c value ("x1−y1") of the above-left CU (x1−1, y1−1), once the video-decoding device finished decoding the current CU, it may replace/override the tidbit for the above-left CU (x1−1, y1−1) stored in the one-dimensional storage structure with the tidbit for the current CU (x1, y1). In other words, since the current CU (x1, y1) and the above-left CU (x1−1, y1−1) may have the same c value, their tidbits are associated with the same storage unit in the one-dimensional storage structure. Once the tidbit for the current CU (x1, y1) is stored into the corresponding storage unit in the one-dimensional storage structure, it will replace/override the previous tidbit value which is stored in this storage unit and associated with the above-left CU (x1−1, y1−1). After the current CU (x1, y1) is decoded, the above-left CU (x1−1, y1−1) is no longer the adjacent CU for any un-decoded CUs, and its tidbit is no longer needed for the decoding of any other CUs. Thus, the overriding of the tidbits for CUs that are no longer needed may provide the space-saving effect.

In some embodiments, the video-decoding device may predict and detect whether the CUs located at the below-left or the above-right of the current CU are already decoded by conducting a prediction analysis based on the information stored in the storage units of the one-dimensional storage structure. Specifically, during the above operation at block S203, in which the video-decoding device may store the tidbit of a decoded CU into a corresponding storage unit in the one-dimensional storage structure based on the storage index calculated using the decoded CU's coordinates, the video-decoding device may further store an additional "location marker" in the corresponding storage unit's storage space. The location marker may store information related to the coordinates of the decoded CU, and may be used to determine whether the CUs located at below-left or above-right of the current CU are decoded.

In some embodiments, the location marker may store the vertical coordinate of the decoded CU. In this case, two storage units having identical location markers may indicate that the two CUs associated with these two storage units are positioned in the same horizontal line/level in the video image. In comparison, two storage units having different location markers may indicate that the two CUs associated with these two storage units may not be positioned in the same horizontal line. In other embodiments, the location marker may be used to record whether the CU associated with the storage unit is located in an even-numbered horizontal line or in an odd-numbered horizontal line. In this case, when two adjacent storage units have identical location markers, it may be used to predict that these two CUs associated with the storage units are located in the same horizontal line. When two adjacent storage units have different location markers, it may indicate that one of the CUs associated with the storage units is located in a horizontal line that is either above or below the other one of the CUs.

FIG. 3-A and FIG. 3-B illustrate multiple scenarios used to determine the location of an adjacent CU using the one-dimensional storage structure, in according to certain embodiments of the present disclosure. The video-decoding device may determine the decoding status of a CU positioned at below-left of the current CU as illustrated in FIG. 3-A. Assuming the current CU is the one marked with "A" in FIG. 3-A, then for all the adjacent CUs left to the current CU, the CU marked with "C" may have the lowest position (lowest in term of being the one CU that is below all other CUs). Assuming that all the storage units in the one-dimensional storage structure are stored based on a small-to-large sorted order of the associated CUs' coordinate differences, with respect to the storage unit for CU "C" (referred to as "M1"), a previous storage unit (referred to as "M2") in the one-dimensional storage structure may be used to store tidbit for CU "C". However, since the CU "B" in FIG. 3-A may have the same horizontal-vertical-coordinate-difference as the CU "B" in FIG. 3-B, it is possible that the storage unit "M2" may be used to store tidbit for either the CU "B" of FIG. 3-A or the CU "B" of FIG. 3-B. In other words, if the storage unit "M2" stores tidbit for the CU "B" of FIG. 3-A, then the storage unit "M2" may be used for the decoding of CU "A." However, if the storage unit "M2" stores tidbit for the CU "B" of FIG. 3-B, then the storage unit "M2" may NOT be used for the decoding of CU "A."

In some embodiments, in order to determine whether the storage unit "M2" stores tidbit for the CU "B" of FIG. 3-A or the CU "B" of FIG. 3-B, the video-decoding device may compare the horizontal-coordinate location markers stored in the storage unit "M1" associated with CU "C" and the storage unit "M2" associated with CU "B." If the locations markers are different for the storage units "M1" and "M2", the video-decoding device may determine that it is the scenario of FIG. 3-A, in which CU "B" is positioned below CU "C", there should be a decoded CU "B" located at the below-left of the CU "A", and the tidbit in the storage unit "M2" may be used for the decoding of CU "A." If the location markers are the same for the storage units "M1" and "M2", the video-decoding device may determine that it is the scenario of FIG. 3-B, in which CU "B" is located left of, and on the same line as, CU "C", there is no decoded CU positioned at the below-left of CU "A", and the tidbit in the storage unit "M2" cannot be used for the decoding of CU "A."

In some embodiments, the video-decoding device may determine the decoding status of a CU positioned at above-right of the current CU as illustrated in FIG. 3-B. Assuming the current CU is the one marked with "A" in FIG. 3-B, then for all the adjacent CUs above the current CU, the CU marked with "G" may have the furthest right position (furthest right in term of being the one CU that is right to all other CUs). Assuming that all the storage units in the one-dimensional storage structure are stored based on a small-to-large sorted order of the associated CUs' coordinate differences, with respect to the storage unit for CU "G" (referred to as "M3"), a subsequent storage unit (referred to as "M4") may be used to store tidbit for CU "H". However, since the CU "H" in FIG. 3-A may have the same horizontal-vertical-coordinate-difference as the CU "H" in FIG. 3-B, it is possible that the storage unit "M4" may be used to store tidbit for either the CU "H" of FIG. 3-A or the CU "H" of FIG. 3-B. In other words, if the storage unit "M4" stores tidbit for the CU "H" of FIG. 3-A, then the storage unit "M4" may NOT be used for the decoding of CU "A."

However, if the storage unit "M2" stores tidbit for the CU "H" of FIG. 3-B, then the storage unit "M4" may be used for the decoding of CU "A."

In some embodiments, in order to determine whether the storage unit "M4" stores tidbit for the CU "H" of FIG. 3-A or the CU "H" of FIG. 3-B, the video-decoding device may compare the vertical-coordinate location markers stored in the storage unit "M3" associated with CU "G" and the storage unit "M4" associated with CU "H." If the locations markers are the same for the storage units "M3" and "M4", the video-decoding device may determine that it is the scenario of FIG. 3-B, in which CU "H" is positioned right to the CU "G", there should be a decoded CU "H" located at the above-right of the CU "A", and the storage unit "M4" may be used for the decoding of CU "A." If the location markers are different for the storage units "M1" and "M2", the video-decoding device may determine that it is the scenario of FIG. 3-A, in which CU "H" is located above of, and on the same vertical line as, CU "G", and the storage unit "M4" cannot be used for the decoding of CU "A."

In some embodiments, during the decoding of the current CU "A", the video-decoding device may predict whether the CUs adjacent to the current CU are decoded or not based on the tidbits stored in the one-dimensional storage structure. The adjacent CUs may include ones located at below-left, above-right, as well as left, above, and above-left of the current CU (e.g, CUs "B", "C", "D", "E", "F", and "G" in FIG. 3-A, plus CU "H" of FIG. 3-B). When in situations the prediction is not accurate, the video-decoding device may apply encoding modification. "Enoding modification" may include the performing of re-encoding or differential encoding of the CU, etc. In some embodiments, there is no need to predict whether CUs located at above-left or below-right of the current CU are encoded or not. Such an approach may further improve the accuracy of prediction result and the efficiency of decoding.

Referring back to FIG. 2. At block S205, the video-decoding device may determine whether all the CUs in the video image are decoded or not. Upon a determination that all the CUs are decoded, the decoding process may terminate at S206. Otherwise, the video-decoding device may repeat the blocks S203 and S204 by selecting the next un-decoded CU, by traversing across all the CUs in a top-to-bottom, left-to-right order. Thus, the method provided by the present disclosure allows the configuring and utilizing of an one-dimensional storage structure for storing tidbits that are located on the above and/or left of the current CU and needed during the decoding of the current CU. Further, the one-dimensional storage structure may not only be used to store the tidbits for usage, but also allow the tidbits to be overridden as soon as they are no longer needed for decoding any other CUs. Such an approach solves the data loss issue as well as the storage space issue caused by the implementing of a two-dimensional storage structure.

It will be understood that example of embodiments may provide with method, device or computer program product, may adopt the form of full hardware embodiment, full software embodiment or combination of both. All or partial steps for manner mentioned above may be done by controlling relevant hardware via program, then the program may store in readable storage medium of computer device in order to execute all or partial steps hereof. The computer device includes, but not limited to: personal computer, server, general computer, dedicated computer, network device, embedded device, programmable device, an intelligent mobile terminal, smart home device, wearable intelligent device and vehicle-mounted intelligent device, The storage medium includes, but not limited to: RAM (random access memory), ROM (read-only memory), disk, tape, disc, flash memory, U disk, mobile hard disk, memory card, memory stick, network server storage, cloud storage networks and etc.

These instructions of computer program configured to process series of steps may also be loaded in computer devices, which made computer device carried out series of operating steps for processing computer implementation, so that these instructions provided for realized designated functional steps in block or multiple blocks and/or block diagram or multiple diagrams.

While inventive concepts have been particularly shown and described with reference to example embodiments thereof, it will be understood that various changes in form and details may be made therein without departing from the spirit and scope of the following claim. Any equivalent structure or processing transformation related to the contents of the specification and drawings above, or utilized directly or indirectly in relevant field should be included in the scope of the patent protection of the present disclosure.

Systems and methods for imaging structures have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present disclosure may be implemented as one or more computer programs or as one or more computer program modules embodied in one or more computer readable media. The term computer readable storage medium refers to any tangible data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, modules and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for storing data related to video decoding, comprising:
    dividing, by a video-decoding device, a video image into a plurality of coding units (CUs), wherein each of the plurality of CUs has a horizontal coordinate and a vertical coordinate with respect to the video image;
    retrieving, by the video-decoding device, a first tidbit associated with a first CU from a one-dimensional storage structure based on a first storage index calculated using a difference between the first CU's horizontal coordinate and vertical coordinate, wherein the first CU is adjacent to an un-decoded second CU selected from the plurality of CUs, and the first tidbit is generated during decoding of the first CU and stored in the one-dimensional storage structure using the first storage index;
    decoding, by the video-decoding device, the second CU based on the first tidbit; and
    storing, by the video-decoding device, a second tidbit associated with the second CU in the one-dimensional storage structure based on a second storage index calculated using the second CU's horizontal and vertical coordinates.

2. The method as recited in claim 1, wherein the one-dimensional storage structure contains a plurality of storage units each of which is associated with a corresponding storage index, and tidbits can be stored to or retrieved from the plurality of storage units using the corresponding storage indexes.

3. The method as recited in claim 2, wherein a number of the plurality of storage units equals to a sum of a first number of storage units horizontally in the video image and a second number of storage units vertically in the video image minus one.

4. The method as recited in claim 2, wherein the retrieving of the first tidbit associated with the first CU from the one-dimensional storage structure further comprising:
    predicting a location of a specific CU in relation to the second CU based on location markers stored in the storage units and associated with the first CU and the specific CU.

5. The method as recited in claim 4, wherein the location markers are horizontal coordinates, and the predicting of the location of the specific CU in relation to the second CU comprising:
    upon determining that the location markers associated with the first CU and the specific CU are NOT equal, predicting the specific CU being adjacent to the below-left of the first CU.

6. The method as recited in claim 4, wherein the location markers are vertical coordinates, and the predicting of the location of the specific CU in relation to the second CU comprising:
    upon determining that the location markers associated with the first CU and the specific CU are equal, predicting the specific CU being adjacent to the above-right of the first CU.

7. The method as recited in claim 1, wherein the first CU is adjacent to the below-left, left, above-left, above, or above-right of the second CU in the video image.

8. A video-decoding device configured for storing data related to video decoding, the video-decoding device comprising a processor and memory coupled with the processor, wherein the memory is configured to provide the processor with instructions for
    dividing a video image into a plurality of coding units (CUs), wherein each of the plurality of CUs has a horizontal coordinate and a vertical coordinate with respect to the video image;
    storing a first tidbit associated with a first CU selected from the plurality of CUs into a one-dimensional storage structure, wherein the first tidbit is generated during decoding of the first CU and stored in the one-dimensional storage structure based on a first storage index calculated using a first difference between the first CU's horizontal coordinate and vertical coordinate; and
    decoding a second CU selected from the plurality of CUs based on the first tidbit, wherein the first CU is adjacent to the second CU, and the first tidbit is retrieved from the one-dimensional storage structure based on the first storage index.

9. The video-decoding device of claim 8, wherein the memory is further configured to provide the processor with instructions for:
    storing a second tidbit associated with the second CU in the one-dimensional storage structure based on a second storage index calculated using a second difference between the second CU's horizontal coordinate and vertical coordinate.

10. The video-decoding device of claim 8, wherein the memory is further configured to provide the processor with instructions for:
    upon determining a second storage index calculated using the second CU's horizontal and vertical coordinates equals to the first storage index, overriding in the one-dimensional storage structure the first tidbit with a second tidbit associated with the second CU.

11. The video-decoding device of claim 8, wherein the one-dimensional storage structure contains a plurality of storage units each of which is associated with a corresponding storage index, and tidbits can be stored to or retrieved from the plurality of storage units using the corresponding storage indexes.

12. The video-decoding device of claim 11, wherein the memory is further configured to provide the processor with instructions for:

predicting a location of a specific CU in relation to the second CU based on location markers stored in the storage units and associated with the first CU and the specific CU.

13. The video-decoding device of claim 12, wherein the location markers are horizontal coordinates, and the predicting of the location of the specific CU in relation to the second CU comprising:

upon determining that the location markers associated with the first CU and the specific CU are NOT equal, predicting the specific CU being adjacent to the below-left of the first CU.

14. The video-decoding device of claim 12, wherein the location markers are vertical coordinates, and the predicting of the location of the specific CU in relation to the second CU comprising:

upon determining that the location markers associated with the first CU and the specific CU are equal, predicting the specific CU being adjacent to the above-right of the first CU.

15. A non-transitory computer-readable storage medium, containing a set of instructions which, when executed by a processor, cause the processor to perform a method for storing data related to video decoding, the method comprising:

dividing, by a video-decoding device, a video image into a plurality of coding units (CUs), wherein each of the plurality of CUs has a horizontal coordinate and a vertical coordinate with respect to the video image;

retrieving, by the video-decoding device, a first tidbit associated with a first CU from a one-dimensional storage structure based on a first storage index calculated using a difference between the first CU's horizontal coordinate and vertical coordinate, wherein the first CU is adjacent to an un-decoded second CU selected from the plurality of CUs, and the first tidbit is generated during decoding of the first CU and stored in the one-dimensional storage structure using the first storage index;

decoding, by the video-decoding device, the second CU based on the first tidbit; and storing, by the video-decoding device, a second tidbit associated with the second CU in the one-dimensional storage structure based on a second storage index calculated using the second CU's horizontal and vertical coordinates.

16. The non-transitory computer-readable storage medium of claim 15, wherein the one-dimensional storage structure contains a plurality of storage units each of which is associated with a corresponding storage index, and tidbits can be stored to or retrieved from the plurality of storage units using the corresponding storage indexes.

17. The non-transitory computer-readable storage medium of claim 15, wherein a number of the plurality of storage units equals to a sum of a first number of storage units horizontally in the video image and a second number of storage units vertically in the video image minus one.

18. The non-transitory computer-readable storage medium of claim 15, wherein the first CU is adjacent to the below-left, left, above-left, above, or above-right of the second CU in the video image.

* * * * *